(12) United States Patent
Li

(10) Patent No.: US 12,204,221 B1
(45) Date of Patent: Jan. 21, 2025

(54) HIGH-BRIGHTNESS LIQUID CRYSTAL HANDWRITING DEVICE

(71) Applicant: WICUE USA INC., Santa Clara, CA (US)

(72) Inventor: Fenghua Li, Cupertino, CA (US)

(73) Assignee: WICUE USA INC., Santa Clara, CA (US)

( * ) Notice: Subject to any disclaimer, the term of this patent is extended or adjusted under 35 U.S.C. 154(b) by 0 days.

(21) Appl. No.: 18/263,131

(22) PCT Filed: Jun. 3, 2023

(86) PCT No.: PCT/US2023/024382
§ 371 (c)(1),
(2) Date: Jul. 26, 2023

(87) PCT Pub. No.: WO2023/249809
PCT Pub. Date: Dec. 28, 2023

Related U.S. Application Data

(60) Provisional application No. 63/354,446, filed on Jun. 22, 2022.

(51) Int. Cl.
*G02F 1/137* (2006.01)
*G02F 1/1333* (2006.01)
*G02F 1/1339* (2006.01)

(52) U.S. Cl.
CPC .... *G02F 1/13718* (2013.01); *G02F 1/133377* (2013.01); *G02F 1/13338* (2013.01); *G02F 1/13394* (2013.01); *G02F 2202/28* (2013.01); *G02F 2202/36* (2013.01)

(58) Field of Classification Search
CPC .......... G02F 1/13718; G02F 1/133377; G02F 1/13338; G02F 1/13394; G02F 2202/36
USPC .................................. 349/12, 115, 156–157
See application file for complete search history.

(56) References Cited

U.S. PATENT DOCUMENTS

| | | | |
|---|---|---|---|
| 5,729,312 A * | 3/1998 | Yamagishi | G02F 1/13394 349/86 |
| 6,049,366 A | 4/2000 | Hakemi et al. | |
| 2020/0026106 A1 | 1/2020 | Lightfoot et al. | |
| 2020/0409199 A1 | 12/2020 | Wild et al. | |

OTHER PUBLICATIONS

International Search Report in International application No. PCT/US2023/24382, mailed on Sep. 5, 2023.

* cited by examiner

*Primary Examiner* — Charles S Chang
(74) *Attorney, Agent, or Firm* — PV IP PC; Wei Te Chung

(57) ABSTRACT

A high-brightness handwriting liquid crystal device is provided. The device includes a substrate, a first base layer disposed on the substrate, a first conductive layer disposed on a side of the first base layer away from the substrate, a second conductive layer opposite to the first conductive layer, a liquid crystal layer disposed between the first conductive layer and the second conductive layer, and a second base layer disposed on a side of the second conductive layer away from the liquid crystal layer. The liquid crystal layer includes a cholesteric liquid crystal mixture and a plurality of spacers, wherein a plurality of lattices is defined by the plurality of spacers, and the cholesteric liquid crystal mixture is filled in the plurality of lattices.

20 Claims, 2 Drawing Sheets

HIGH-BRIGHTNESS LIQUID CRYSTAL HANDWRITING DEVICE

CROSS-REFERENCE TO RELATED APPLICATIONS

This application is a national stage of International Application No. PCT/US2023/024382, filed on Jun. 3, 2023, which claims priority to U.S. Provisional Application No. 63/354,446, filed on Jun. 22, 2022. Both of the aforementioned applications are hereby incorporated by reference in their entireties.

TECHNICAL FIELD

The disclosure relates to the technical field of liquid crystal handwriting devices, in particular to a high-brightness handwriting liquid crystal device.

BACKGROUND

With the advancement and development of science and technology, the application scenarios of handwriting liquid crystal devices are becoming more and more extensive. The current handwriting liquid crystal device is generally provided with a first substrate layer, a first conductive layer, a liquid crystal layer, a second conductive layer, a second substrate layer and a substrate in sequence. The liquid crystal layer is generally formed by mixing cholesteric liquid crystal, chiral agent and glue. By adjusting the content of the chiral agent, the cholesteric liquid crystal reflects the lights of specific wavelengths, so that the handwriting liquid crystal device displays different colors in use. The glue is usually to mix with the prepared cholesteric liquid crystal to produce a polymerization reaction through UV effect, and finally form a liquid crystal layer. The glue also makes the upper and lower sides of the liquid crystal layer tightly contact the first conductive layer and the second conductive layer, respectively.

The handwriting liquid crystal device is based on the bistable characteristics of the cholesteric liquid crystal. When handwriting starts, the cholesteric liquid crystal molecules flow and are arranged in the P state, thereby reflecting the incident lights. At this time, if the background is black, the writing is displayed on the black background and is observed. The color of the writing is determined by the wavelength of the reflected lights. When the liquid crystal molecules are arranged in the FC state, the incident lights are scattered, and the color of the background observed at this time is black.

In the existing handwriting liquid crystal device, glue needs to be added to the liquid crystal layer for polymerization reaction and to contact with the conductive layer. However, the combined structure with the glue can greatly affect the brightness of handwriting. On one hand, the refractive index of the glue is different from that of the liquid crystal, and the glue has a great influence on the brightness of the reflected handwriting due to scattering. On the other hand, it is difficult to separate the cholesteric liquid crystal from the glue in the liquid crystal layer. The display effect of the handwriting has a great relationship with separation of cholesteric liquid crystal.

SUMMARY

A purpose of the present disclosure is to provide a high-brightness handwriting liquid crystal device. The high-brightness handwriting liquid crystal device includes a substrate, a first base layer disposed on the substrate, a first conductive layer disposed on a side of the first base layer away from the substrate, a second conductive layer opposite to the first conductive layer, a liquid crystal layer disposed between the first conductive layer and the second conductive layer, and a second base layer disposed on a side of the second conductive layer away from the liquid crystal layer. The liquid crystal layer includes a cholesteric liquid crystal mixture and a plurality of spacers, an upper end of each of the plurality of spacers is in contact with the second conductive layer, and a lower end of each of the plurality of spacers is in contact with the first conductive layer. A plurality of lattices is defined by the plurality of spacers, and the cholesteric liquid crystal mixture is filled in the plurality of lattices. The cholesteric liquid crystal mixture is obtained by mixing nematic liquid crystals, chiral agents and microparticles.

In some embodiments, the plurality of spacers is connected to define a plurality of regular hexagonal lattices.

In some embodiments, the plurality of spacers is connected to define a plurality of regular quadrilateral lattices.

In some embodiments, a thickness of the spacer is less than 40 microns.

In some embodiments, the spacer is arranged perpendicularly to the first conductive layer and the second conductive layer.

In some embodiments, the spacer is formed by a curing glue.

In some embodiments, the first conductive layer and the second conductive layer are transparent conductive electrodes.

In some embodiments, the first base layer and the second base layer are transparent film layers.

In some embodiments, the substrate is a black substrate or a transparent substrate.

Another purpose of the present disclosure is to provide a preparation method for high-brightness handwriting liquid crystal device. The preparation method includes: providing a first base layer and a second base layer; disposing a first conductive layer on the first base layer, and disposing a second conductive layer on the second base layer; forming a plurality of spacers on the first conductive layer, wherein a plurality of lattices is defined by the plurality of spacers; preparing a liquid crystal mixture with TN type liquid crystal, chiral agent and microparticles; filing the liquid crystal mixture into the plurality of lattices; covering the plurality of spacers and the plurality of lattices with the second base layer and the second conductive layer, wherein the second conductive layer contacts with the plurality of spacers tightly; and disposing the second base layer on a substrate.

In some embodiments, the first base layer and the second base layer are transparent film layers.

In some embodiments, the first base layer and the second base layer are transparent PET films.

In some embodiments, the first conductive layer and the second conductive layer are ITO conductive layers.

In some embodiments, the plurality of spacers is formed through a mold, by using a light-curing glue.

In some embodiments, the substrate is a black substrate or a transparent substrate.

In some embodiments, the plurality of spacers is connected to define a plurality of regular hexagonal lattices.

In some embodiments, the plurality of spacers is connected to define a plurality of regular quadrilateral lattices.

In some embodiments, a thickness of the spacer is less than 40 microns.

In some embodiments, the spacer is arranged perpendicularly to the first conductive layer and the second conductive layer.

BRIEF DESCRIPTION OF THE DRAWINGS

In order that the technical solution in the embodiments of the present disclosure may be explained more clearly, references will now be made briefly to the accompanying drawings required for the description of the embodiments. The accompanying drawings in the following description are merely some of the embodiments of the present disclosure, and other drawings may be made to those skilled in the art without involving any inventive effort.

DETAILED DESCRIPTION OF THE EMBODIMENTS

Figure 1:
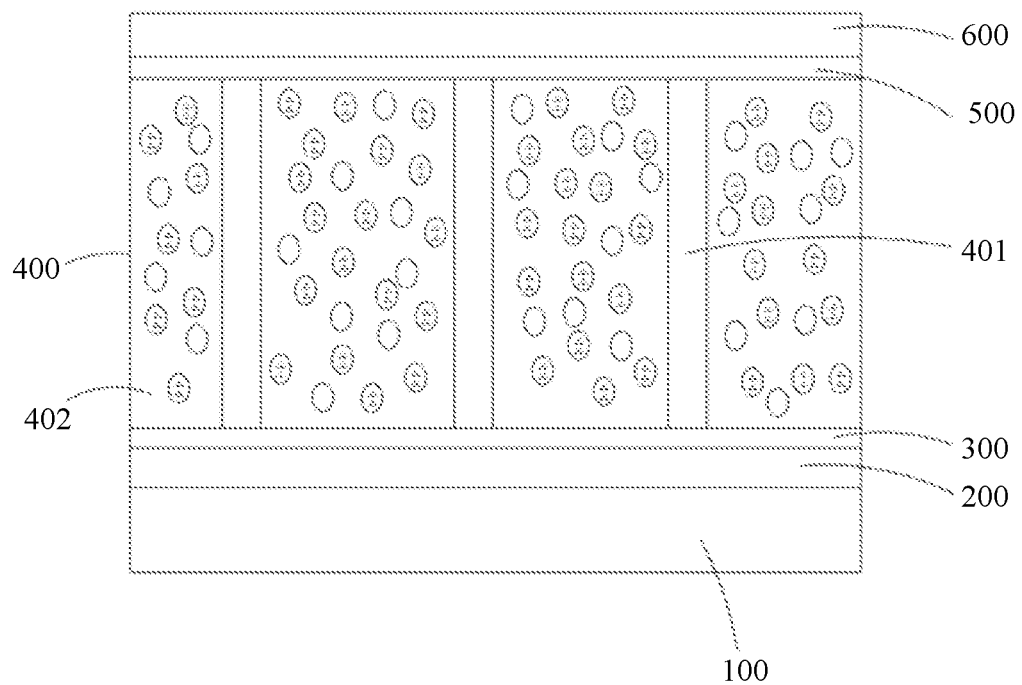
FIG. 1 is a schematic structural diagram of a high-brightness handwriting liquid crystal device according to embodiments of the present disclosure.

The technical solutions in the embodiments of the present disclosure will be clearly and completely described below with reference to the accompanying drawings in the embodiments of the present disclosure. The described embodiments are only a part of the embodiments of the present disclosure, not all of the embodiments. Based on the embodiments of the present disclosure, all other embodiments obtained by those of ordinary skill in the art without creative efforts shall fall within the protection scope of the present disclosure.

It should be noted that if there are directional indications (such as up, down, left, right, front, back) involved in the embodiments of the present disclosure, then, the directional indication is only used to explain the relative positional relationship, movement situation, etc. among the components under a certain posture (as shown in the attached image). If the specific posture changes, the directional indication changes accordingly.

In addition, if there are descriptions involving "first", "second", etc. in the embodiments of the present disclosure, the descriptions of "first", "second", etc. are only used for description purposes, which should not be understood as indicating or implying their relative importance or implying the number of technical features indicated. Thus, a feature delimited with "first", "second" may expressly or implicitly include at least one of that feature. In addition, the technical solutions between the various embodiments can be combined with each other, but must be based on the realization by those of ordinary skill in the art. When the combination of technical solutions contradicts each other or cannot be realized, it should be considered that such combination of technical solutions does not exist and is not within the protection scope of the present disclosure.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA. AAB, AABBCCC, etc.

In the description of the disclosure, unless expressly defined and defined otherwise, terms such as "connected with", "connected to", "mounted", "fixed" and the like are to be understood in a broad sense, for example, may be fixedly connected, detachably connected, or as a whole; may be mechanically connected or electrically connected; may be directly connected, indirectly connected through an intermediate medium, connected inside the two elements or interacted between the two elements. It will be appreciated by those of ordinary skill in the art that the foregoing may be understood as a specific meaning within the present application, depending on the specific circumstances.

Referring to FIG. 1, a high-brightness handwriting liquid crystal device is provided. The high-brightness handwriting liquid crystal device includes a substrate 100, a first base layer 200, a first conductive layer 300, a liquid crystal layer 400, a second conductive layer 500, and second base layer 600. The first base layer 200 is disposed on the substrate 100, and the first conductive layer 300 is disposed on a side of the first base layer 200 away from the substrate 100. The second conductive layer 500 is opposite to the first conductive layer 300, and the liquid crystal layer 400 is disposed between the first conductive layer 300 and the second conductive layer 500. The second base layer 600 is disposed on a side of the second conductive layer 500 away from the liquid crystal layer 400.

The liquid crystal layer 400 includes a liquid crystal mixture and a plurality of spacers 401. An upper end of each of the plurality of spacers 401 is in contact with the second conductive layer 500, and a lower end of each of the plurality of spacers 401 is in contact with the first conductive layer 300. A plurality of lattices 402 is defined by the spacers 401, and the liquid crystal mixture is filled in the lattices 402, as such, the handwriting liquid crystal device can be arbitrarily tailored to the required size.

Figure 2:
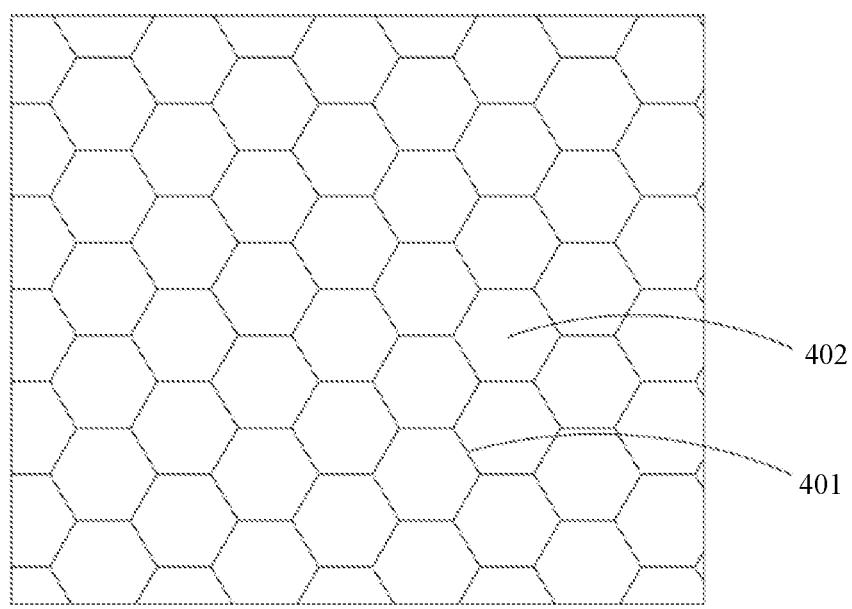
FIG. 2 is a top view of a liquid crystal layer of a high-brightness handwriting liquid crystal device according to embodiments of the present disclosure.

Referring to FIG. 2, in an embodiment, the plurality of spacers 401 are connected to define a plurality of regular hexagonal lattices. That is, a shape of each of the plurality of the lattices 402 is a regular hexagon. Combined with FIG. 1, the spacer 401 is disposed between the first conductive layer 300 and the second conductive layer 500, and perpendicular to the first conductive layer 300 and the second conductive layer 500. The heights of the lattices 402 are the same, to ensure that the entire liquid crystal layer 400 has a uniform height. The thickness of the spacer 401 is relatively thin, to prevent the handwriting from being effected by the spacer 401. This is, when writing with the device, the handwriting crossing the lattices are detected, instead, the handwriting crossing the spacers 401 is not easily detected due to a thin thickness of the spacer 401. As such, the handwriting is present continuous. In an embodiment, the thickness of the spacer 401 is less than 40 microns.

Figure 3:
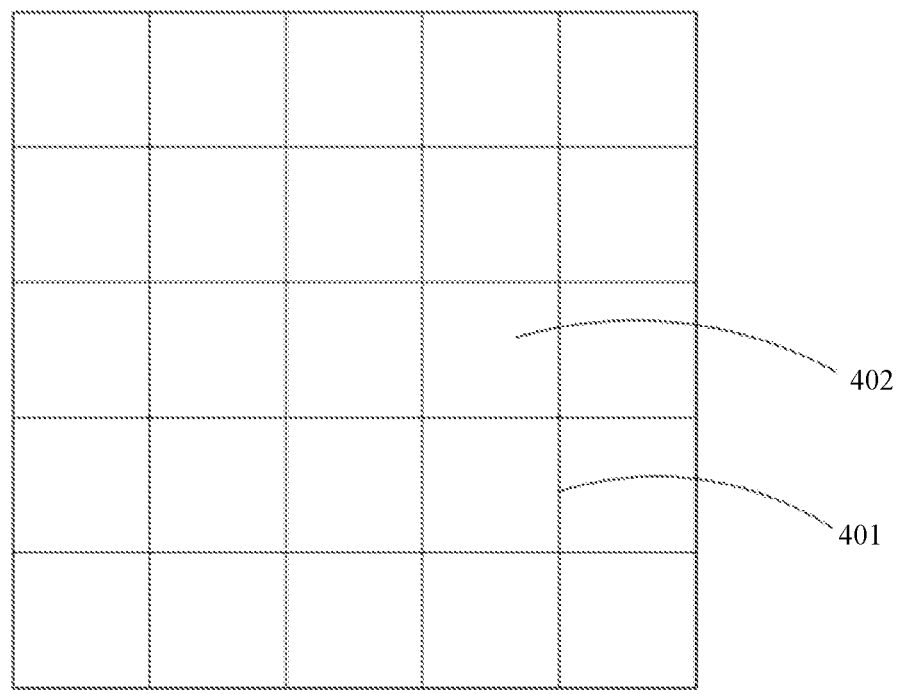
FIG. 3 is a top view of another liquid crystal layer of a high-brightness handwriting liquid crystal device according to embodiments of the present disclosure.

Referring to FIG. 3, in another embodiment, the plurality of spacers 401 are connected to define a plurality of regular quadrilateral lattices. That is, a shape of each of the plurality of the lattices 402 is a regular quadrilateral.

In an embodiment, the plurality of spacers 401 is formed by curing glue. The glue is a mixed polymer, and is usually UV-curing glue.

Further, the liquid crystal mixture is obtained by mixing liquid crystal, chiral agent and microparticles.

In an embodiment, it is optionable to mix nematic liquid crystal and chiral agent to obtain cholesteric liquid crystal. Microparticles are optionally silicon spheres. The liquid crystal mixture described here can be prepared by mixing the prepared cholesteric liquid crystal and microparticles. The content of the cholesteric liquid crystal, the microparticles and the liquid crystal mixture is specifically quantified according to actual needs, which is not elaborated here. The microparticles used have certain selectivity. In an embodiment, the particle size of the microparticles used should match the particle size of the liquid crystal molecules. Further, the optical refractive index of the selected microparticles should be lower than the optical refractive index of the glue. The function of the microparticles is not only to keep the heights of the lattices consistent, but also to stabilize the liquid crystal mixture in the lattices to prevent the liquid crystal mixture from falling down.

In an embodiment, both the first conductive layer 300 and the second conductive layer 500 are ITO transparent conductive electrodes. The first base layer 200 and the second base layer 600 are PET transparent film layers. The first conductive layer 300 is electroplated on the side of the first base layer 200 close to the liquid crystal layer 400. The second conductive layer 500 is electroplated on a side of the second base layer 600 close to the liquid crystal layer 400. The second conductive layer 500 is a transmitting electrode, and the first conductive layer 300 is a receiving electrode, so that a stable electric field is generated between the second conductive layer 500 and the first conductive layer 300. With the electric field, the liquid crystal layer 400 be stably driven to change state.

Referring to FIG. 1, in an embodiment, the substrate 600 includes a black matrix. Based on the bistable characteristics of cholesteric liquid crystal, in a case that the cholesteric liquid crystal molecules are arranged in the P state, the incident lights are reflected. With the black matrix of the substrate 600, the writing is displayed, and the color of the writing is determined by the reflected lights and the wavelength. In a case that the liquid crystal molecules are arranged in the FC state, the incident lights are scattered, and the color of the substrate 600 (the color of the black matrix) is observed at this time.

Figure 4:
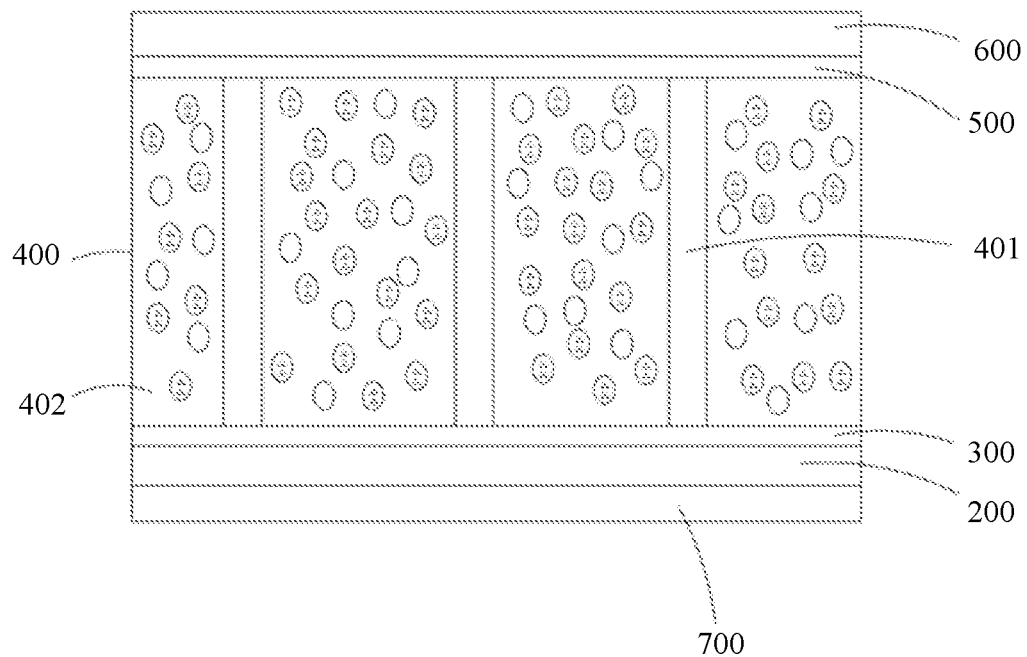
FIG. 4 is a schematic structural diagram of another high-brightness handwriting liquid crystal device according to embodiments of the present disclosure.

Referring to FIG. 4, in another embodiment, the substrate which the first base layer 200 is disposed on is a transparent adhesive layer 700. The high-brightness handwriting liquid crystal device can be used on colored planes such as walls and boards with different background colors. With a transparent substrate 700, the color of the handwriting is based on the different background colors used, which increases the use interest of the high-brightness handwriting liquid crystal device.

According to the present disclosure, the liquid crystal layer is spaced into a plurality of lattices by a plurality of spacers, and then the liquid crystal mixture is filled into the lattices. The liquid crystal mixture of the present disclosure does not need to add glue to play a bonding effect, so that the liquid crystal is not affected by the refractive index of the glue, and the brightness of the handwriting is greatly increased. The plurality of spacers can also increase the stability of the handwriting liquid crystal device. Since the spacers are connected to define several polygonal lattices, and each lattice space is filled with the liquid crystal mixture, the handwriting liquid crystal device can be arbitrarily tailored to the required size.

A preparation method for high-brightness handwriting liquid crystal device is provided. The preparation method may include the following steps.

Step 1: transparent PET films are selected as a first base layer 200 and a second base layer 600, respectively. An ITO conductive layer is plated on a side of the first base layer 200 to obtain a first conductive layer 300, and an ITO conductive layer is plated on a side of the second base layer 600 to obtain a second conductive layer 500.

Step 2: a plurality of spacers 401 is formed on the first conductive layer 300 through a mold, by using light-curing glue, and a plurality of lattices 402 is defined by the plurality of spacers 401.

Step 3: a liquid crystal mixture is prepared by mixing cholesteric liquid crystal and microparticles, wherein the cholesteric liquid crystal is obtained by mixing TN type liquid crystal and chiral agent.

Step 4: the liquid crystal mixture is filled into the lattices 402 defined by the spacers 401.

Step 5: the second base layer 600 and the second conductive layer 500 are disposed on the spacers 401 and the lattices 402, and the second conductive layer 500 contacts with the spacers 401 tightly.

Step 6: the second base layer 500 is disposed on a substrate 100.

The above-mentioned steps are a brief description of the preparation method for the high-brightness handwriting liquid crystal device in the present disclosure, and the sequence of steps 1 to 6 should not be interpreted as limit to the present disclosure.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the scope of the disclosure as defined by the appended claims. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A high-brightness handwriting liquid crystal device, comprising:
 a substrate,
 a first base layer disposed on the substrate,
 a first conductive layer disposed on a side of the first base layer away from the substrate,
 a second conductive layer opposite to the first conductive layer,
 a liquid crystal layer disposed between the first conductive layer and the second conductive layer, and a second base layer disposed on a side of the second conductive layer away from the liquid crystal layer, wherein the liquid crystal layer includes a cholesteric liquid crystal mixture and a plurality of spacers, an upper end of each of the plurality of spacers is in contact with the second conductive layer, and a lower end of each of the plurality of spacers is in contact with the first conductive layer; wherein a plurality of lattices is defined by the plurality of spacers, and the cholesteric liquid crystal mixture is filled in the plurality of lattices; wherein the cholesteric liquid crystal mixture is obtained by mixing nematic liquid crystals, chiral agents and microparticles.

2. The high-brightness handwriting liquid crystal device of claim 1, wherein the plurality of spacers is connected to define a plurality of regular hexagonal lattices.

3. The high-brightness handwriting liquid crystal device of claim 1, wherein the plurality of spacers is connected to define a plurality of regular quadrilateral lattices.

4. The high-brightness handwriting liquid crystal device of claim 1, wherein a thickness of the spacer is less than 40 microns.

5. The high-brightness handwriting liquid crystal device of claim 1, wherein the spacer is arranged perpendicularly to the first conductive layer and the second conductive layer.

6. The high-brightness handwriting liquid crystal device of claim 1, wherein the spacer is formed by a curing glue.

7. The high-brightness handwriting liquid crystal device of claim 1, wherein the first conductive layer and the second conductive layer are transparent conductive electrodes.

8. The high-brightness handwriting liquid crystal device of claim 1, wherein the first base layer and the second base layer are transparent film layers.

9. The high-brightness handwriting liquid crystal device of claim 1, wherein the substrate is a black substrate or a transparent substrate.

10. A preparation method for high-brightness handwriting liquid crystal device, comprising:

providing a first base layer and a second base layer;

disposing a first conductive layer on the first base layer, and disposing a second conductive layer on the second base layer, forming a plurality of spacers on the first conductive layer, wherein a plurality of lattices is defined by the plurality of spacers;

preparing a liquid crystal mixture with TN type liquid crystal, chiral agent and microparticles;

filing the liquid crystal mixture into the plurality of lattices;

covering the plurality of spacers and the plurality of lattices with the second base layer and the second conductive layer, wherein the second conductive layer contacts with the plurality of spacers tightly; and disposing the second base layer on a substrate.

11. The preparation method for high-brightness handwriting liquid crystal device of claim 10, wherein the first base layer and the second base layer are transparent film layers.

12. The preparation method for high-brightness handwriting liquid crystal device of claim 11, wherein the first base layer and the second base layer are transparent PET films.

13. The preparation method for high-brightness handwriting liquid crystal device of claim 11, wherein the first conductive layer and the second conductive layer are ITO conductive layers.

14. The preparation method for high-brightness handwriting liquid crystal device of claim 11, wherein the plurality of spacers is formed through a mold, by using a light-curing glue.

15. The preparation method for high-brightness handwriting liquid crystal device of claim 11, wherein the substrate is a black substrate.

16. The preparation method for high-brightness handwriting liquid crystal device of claim 11, wherein the substrate is a transparent substrate.

17. The preparation method for high-brightness handwriting liquid crystal device of claim 11, wherein the plurality of spacers is connected to define a plurality of regular hexagonal lattices.

18. The preparation method for high-brightness handwriting liquid crystal device of claim 11, wherein the plurality of spacers is connected to define a plurality of regular quadrilateral lattices.

19. The preparation method for high-brightness handwriting liquid crystal device of claim 11, wherein a thickness of the spacer is less than 40 microns.

20. The preparation method for high-brightness handwriting liquid crystal device of claim 11, wherein the spacer is arranged perpendicularly to the first conductive layer and the second conductive layer.

* * * * *